(12) United States Patent
Bomleny et al.

(10) Patent No.: US 7,222,475 B2
(45) Date of Patent: May 29, 2007

(54) HEADER HYDRAULIC FLOAT SYSTEM

(75) Inventors: Duane Michael Bomleny, Geneseo, IL (US); Jay Tyler Hulscher, Belle Plaine, MN (US); Travis L. Bunde, Spakopee, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/125,419

(22) Filed: May 10, 2005

(65) Prior Publication Data

US 2006/0254232 A1    Nov. 16, 2006

(51) Int. Cl.
  *A01D 41/14* (2006.01)
  *A01D 46/08* (2006.01)

(52) U.S. Cl. ............................. 56/10.2 E

(58) Field of Classification Search .......... 56/10.2 E, 56/10.2 D, 10.2 F, 10.2 R, DIG. 15, 208
See application file for complete search history.

(56) References Cited

U.S. PATENT DOCUMENTS

| | | | |
|---|---|---|---|
| 3,597,907 A | 8/1971 | Neal | |
| 3,623,304 A | 11/1971 | Molzahn | |
| 3,717,995 A | 2/1973 | Case | |
| 3,959,957 A | 6/1976 | Halls | |
| 4,193,250 A * | 3/1980 | Kessens et al. | 56/208 |
| 4,307,559 A | 12/1981 | Jupp et al. | |
| 4,409,778 A | 10/1983 | McNaught | |
| 4,437,295 A | 3/1984 | Rock | |
| 4,622,803 A | 11/1986 | Lech | |
| 4,724,661 A | 2/1988 | Blakeslee et al. | |
| 4,733,523 A | 3/1988 | Dedeyne et al. | |
| 4,776,153 A | 10/1988 | DePauw et al. | |
| 5,005,343 A | 4/1991 | Patterson | |
| 5,463,854 A | 11/1995 | Chmielewski, Jr. et al. | |
| 5,464,371 A | 11/1995 | Honey | |
| 5,471,823 A | 12/1995 | Panoushek et al. | |
| 5,473,870 A | 12/1995 | Panoushek et al. | |
| 5,535,577 A | 7/1996 | Chmielewski et al. | |
| 5,535,578 A | 7/1996 | Honey | |
| 5,577,373 A | 11/1996 | Panoushek et al. | |
| 5,633,452 A | 5/1997 | Bebernes | |
| RE35,543 E | 7/1997 | Patterson | |
| 5,661,964 A * | 9/1997 | Paulson et al. | 56/64 |

(Continued)

FOREIGN PATENT DOCUMENTS

EP    0 208 794    7/1985

OTHER PUBLICATIONS

European Search Report, Aug. 11, 2006, 7 Pages.

*Primary Examiner*—Árpád Fábián Kovács

(57) ABSTRACT

In an agricultural combine, a header float system using a floating header having a frame, a support member supporting the frame from the ground, and a suspension variably supporting the frame from the combine. The suspension comprises a sub-frame removable attaching to the combine, links movably attaching the frame and the sub-frame, and one or more float cylinders moveably supporting the frame from the sub-frame. A float circuit connects to the float cylinder, and a float valve connects the float circuit to a main hydraulic circuit. A pressure sensor connects to the float circuit, and a controller communicates with the float valve and the pressure sensor. The controller maintains pressure in the float circuit at a target value by continuously reading the pressure sensor and commanding the float valve to add or subtract hydraulic fluid in the float circuit until pressure equals the target value.

15 Claims, 10 Drawing Sheets

U.S. PATENT DOCUMENTS

| | | |
|---|---|---|
| 5,713,190 A | 2/1998 | Vermeulen et al. |
| 5,799,483 A | 9/1998 | Voss et al. |
| 5,906,089 A | 5/1999 | Guinn et al. |
| 5,964,077 A | 10/1999 | Guinn |
| 5,983,615 A | 11/1999 | Schmid et al. |
| 6,041,583 A | 3/2000 | Guering et al. |
| 6,202,395 B1 | 3/2001 | Gramm |
| 6,675,568 B2 | 1/2004 | Patterson et al. |
| 6,758,029 B2 | 7/2004 | Beaujot |
| 2003/0140609 A1 | 7/2003 | Beaujot |

\* cited by examiner

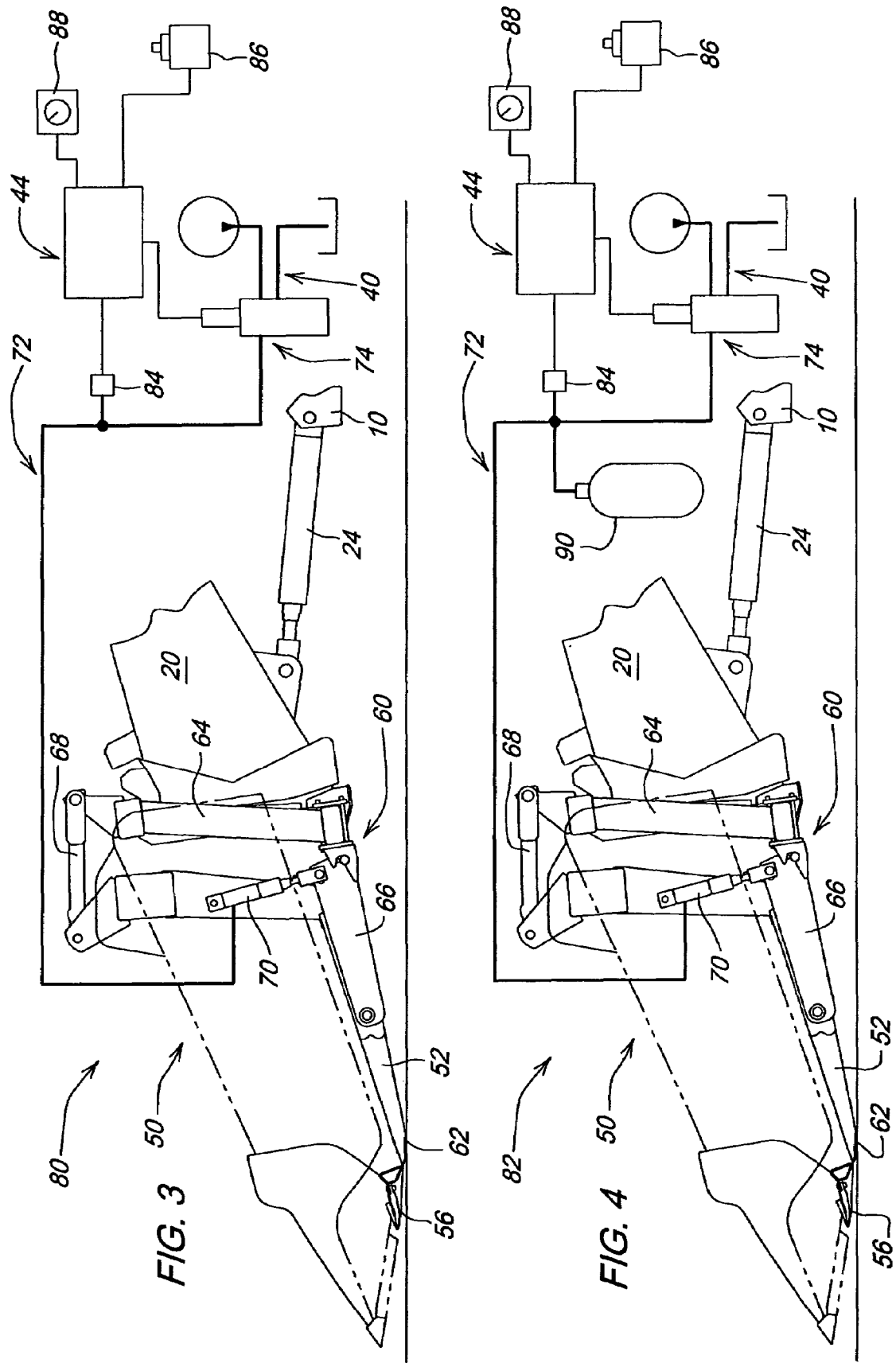

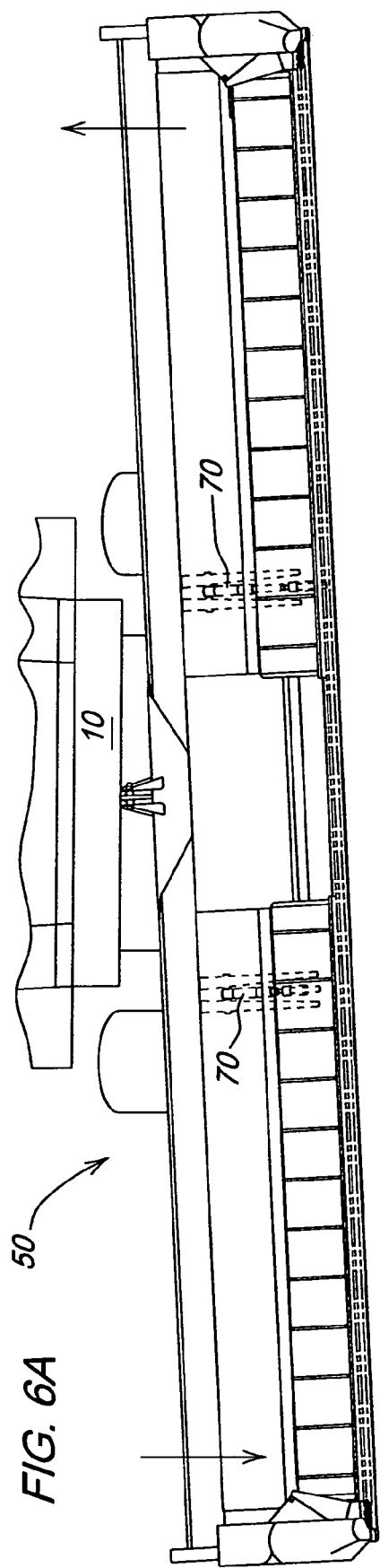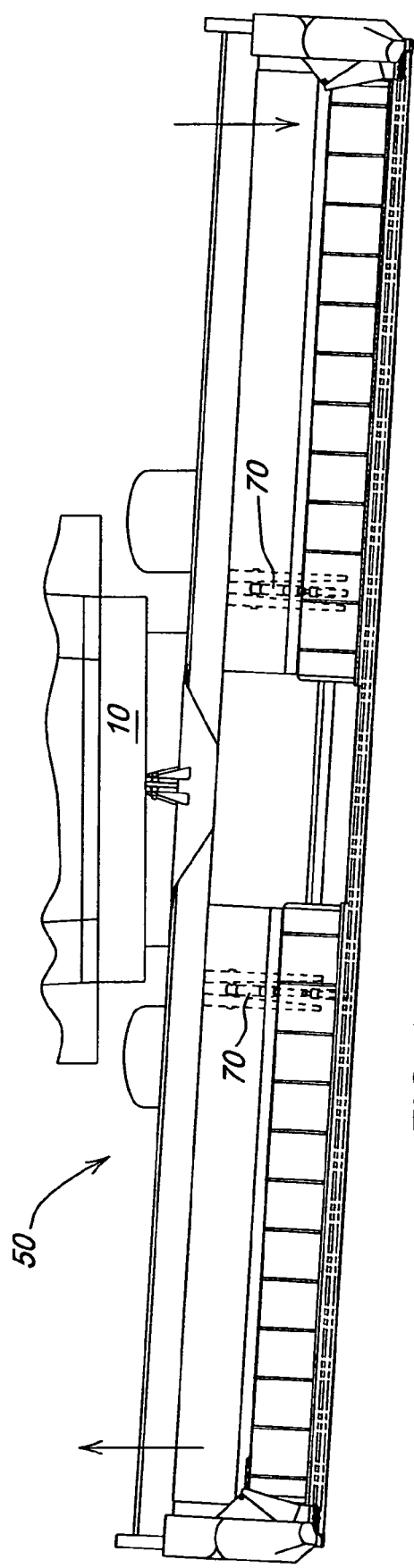

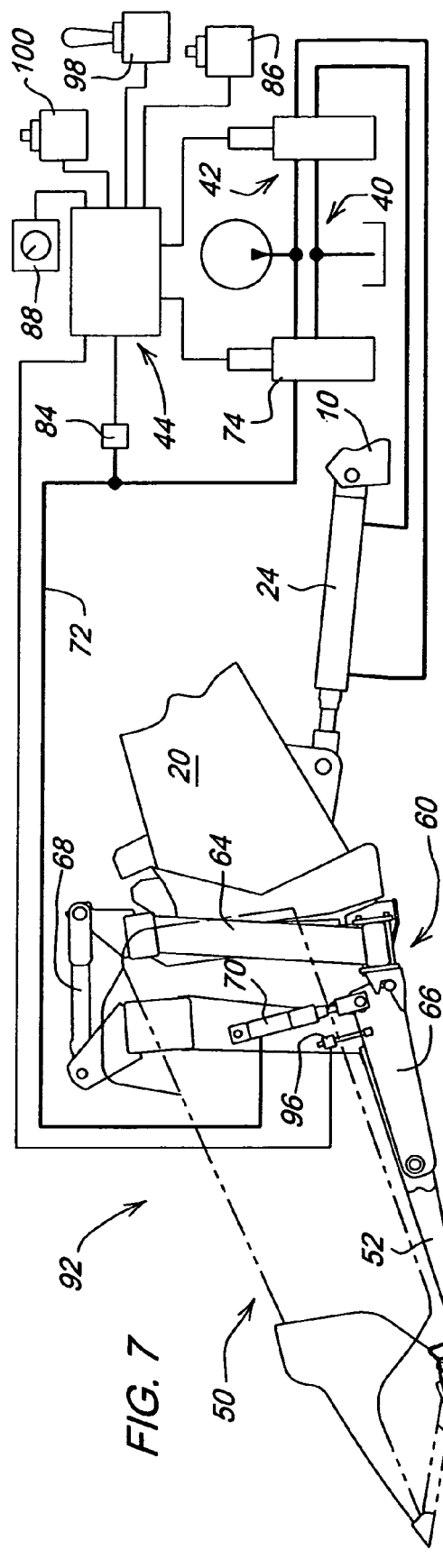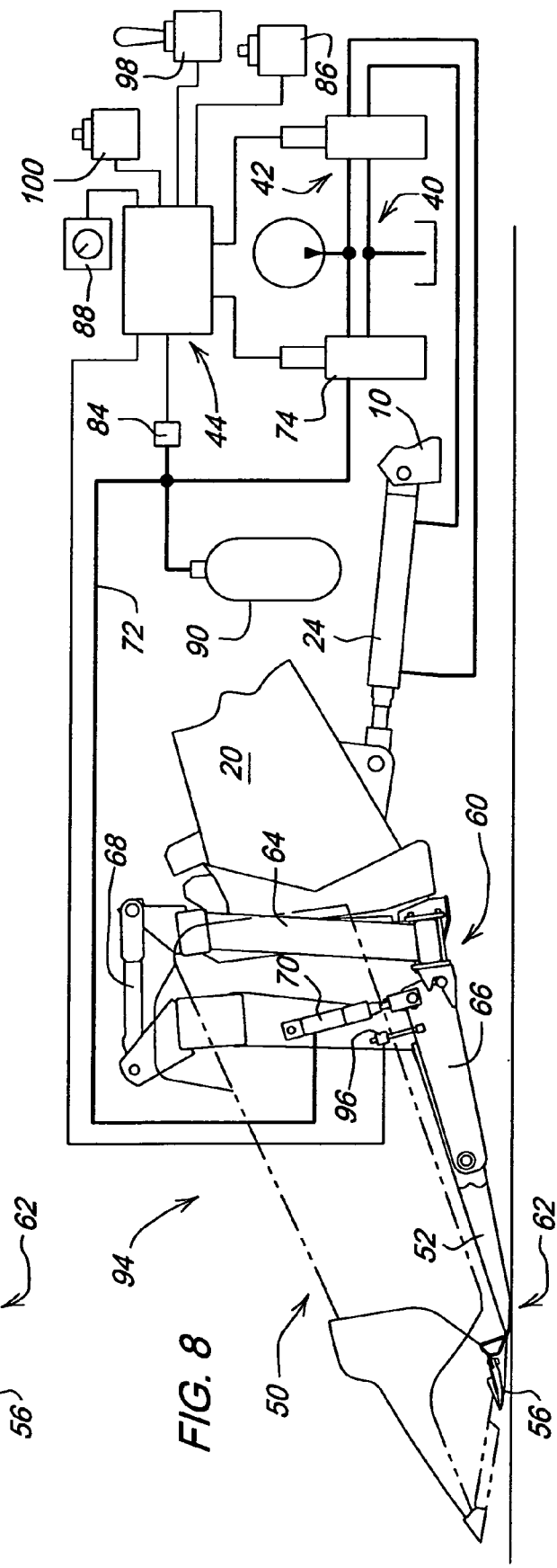

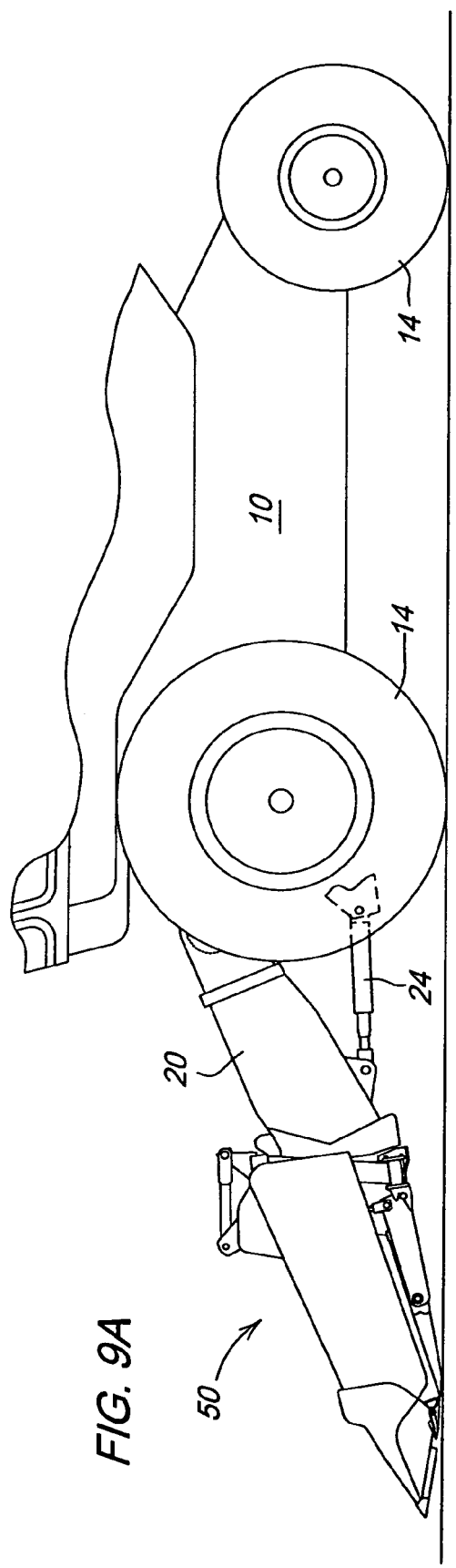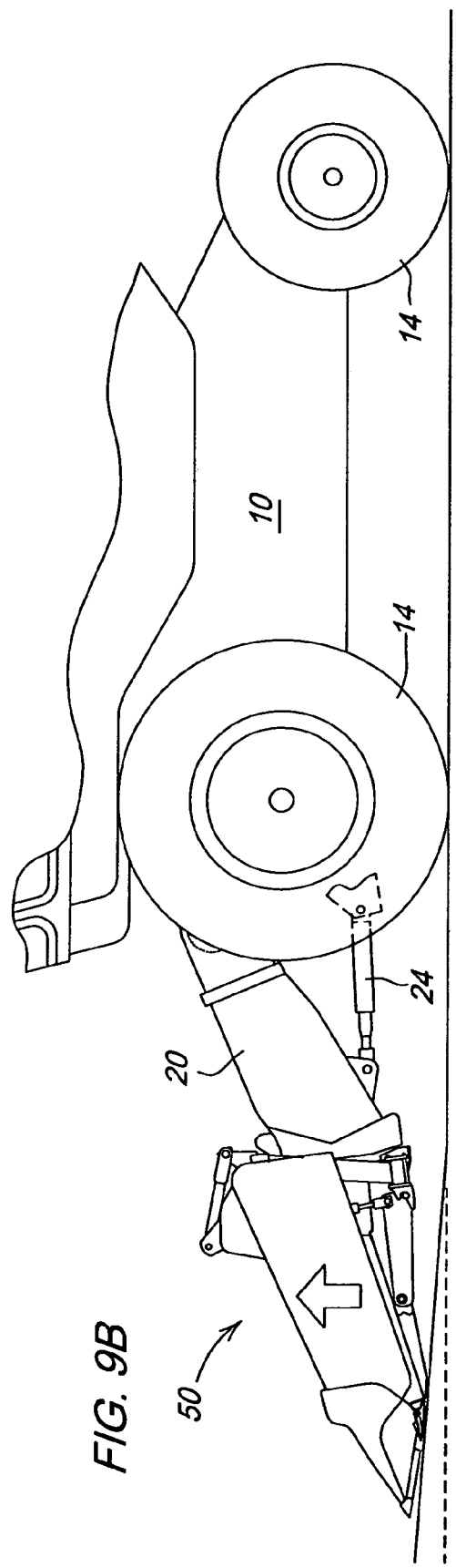

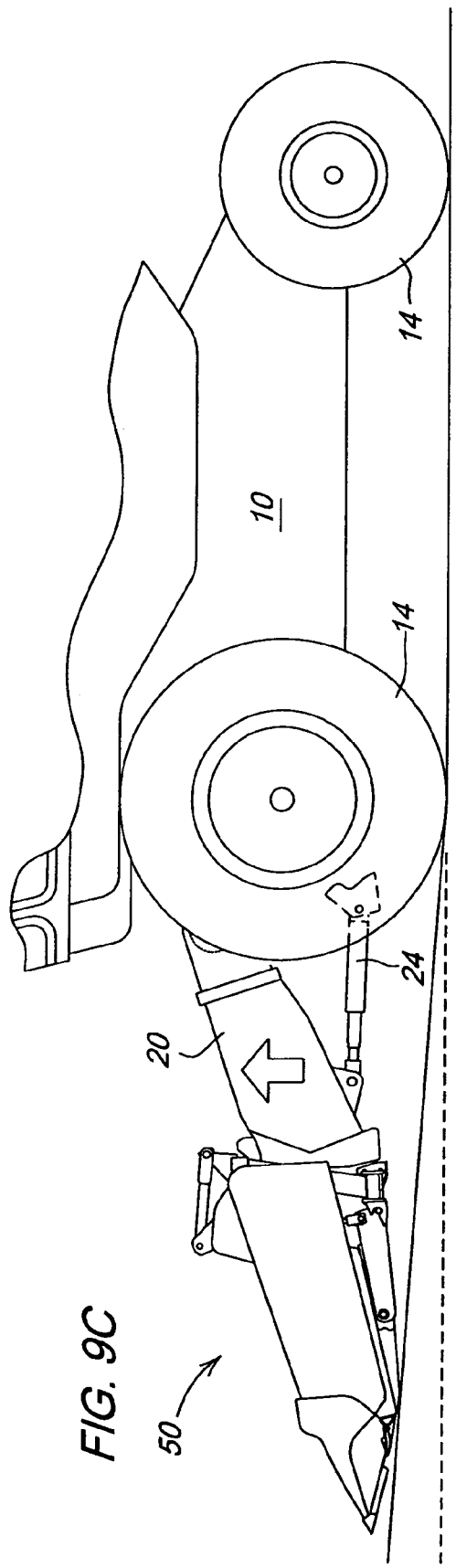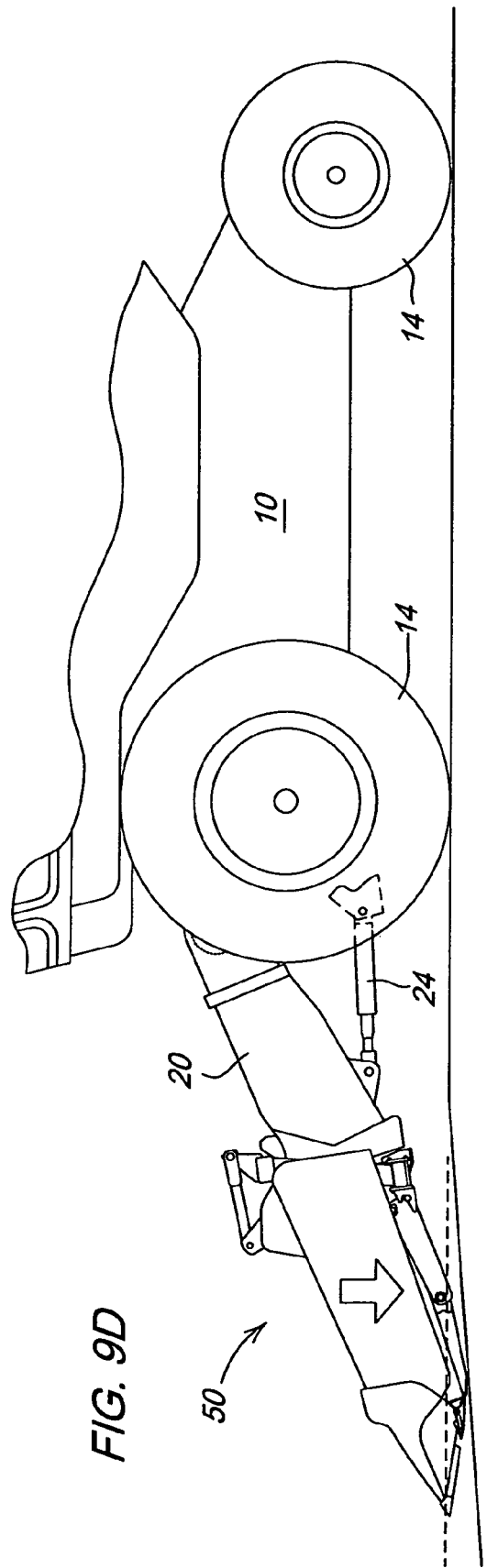

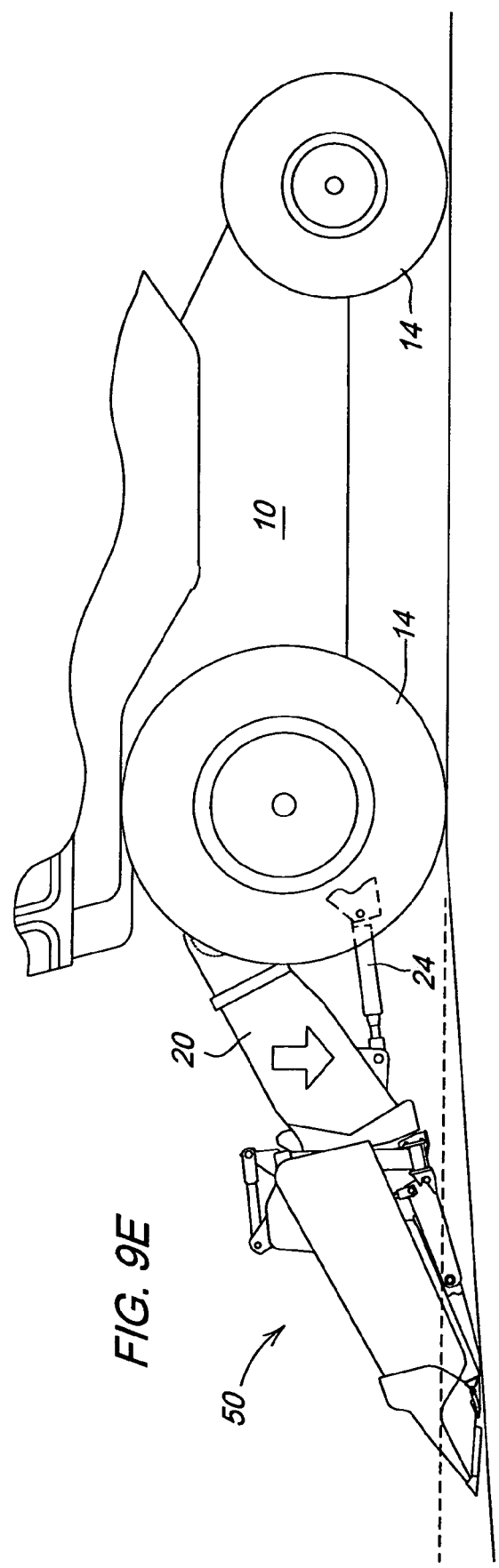

HEADER HYDRAULIC FLOAT SYSTEM

FIELD OF THE INVENTION

The present invention relates to floating platform and draper-type headers for agricultural combines. The present invention also relates to header float systems and header terrain following systems for agricultural combines.

BACKGROUND OF THE INVENTION

An agricultural combine is a large machine used to harvest a variety of crops from a field. During a harvesting operation, a header at the front of the combine cuts ripened crop from the field. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

Platform headers and draper headers are header types commonly used when harvesting crops such as small grains, peas, lentils, and rice. During a harvesting operation with these header types, it is desirable to maintain a cutting height as low as possible to the ground in order to collect substantially the entire ripe crop from the field. To accomplish this, combines typically employ a header float system or a terrain following system to enable the header to follow the ground over changing terrain without gouging or digging into the soil.

Manufacturers have developed a number of such systems over the years. U.S. Pat. Nos. 3,717,995, 3,623,304, and 4,724,661 disclose examples of header float systems using resilient means to suspend the header, thereby reducing the apparent weight of the header, allowing it to lightly skid across the ground over changing terrain. U.S. Pat. Nos. 3,597,907, 4,622,803 and 5,471,823 disclose examples of similar float systems, but using dynamic means to suspend the header. U.S. Pat. Nos. 5,577,373, 6,041,583 and 6,758,029 B2 disclose examples of terrain following systems using dynamic means to position the header, thereby sensing and changing the vertical position of the header to follow changing terrain.

SUMMARY OF THE INVENTION

The illustrated embodiment presents a floating header design implemented with a draper-type header. The header includes a frame having a conventional configuration, and a floating suspension system extending from the frame having a sub-frame removably attaching to the feederhouse. Float cylinders extending between the frame and sub-frame moveably support the header from the combine. The float cylinders connect to a float circuit, which in turn connects to a main hydraulic circuit on the combine by a float valve. The float valve is an electronically controlled hydraulic valve commanded by a controller.

In a first embodiment of a header float system used with the floating header, the controller continuously maintains a target pressure in the float circuit as the float cylinders reciprocate over changing terrain. In header float mode, the system provides constant support of the header by the float suspension as the combine travels through the field. In a second embodiment of a header float system, the controller only initially charges and seals pressure in the float circuit to a target value, with an accumulator acting to maintain target pressure in the float circuit as the float cylinders reciprocate over changing terrain. In a terrain following system, the controller continuously adjusts header height over changing terrain by raising and lowering the feederhouse in response to movement of the floating header suspension. When operating in this mode, the controller maintains the position of the float header for optimal function of the header float system as the combine travels through the field.

DESCRIPTION OF THE DRAWINGS

FIG. 3 is a schematic for a dynamic header float system used with the illustrated floating header.

FIG. 4 is a schematic for a resilient header float system used with the illustrated floating header.

FIG. 6A shows a front-view of the combine operating on right-rolling ground with an illustrated float system and the floating header.

FIG. 6B shows a front-view of the combine operating on left-rolling ground with an illustrated float system and the floating header.

FIG. 7 is a schematic for a dynamic header terrain following system combined with the illustrated dynamic float system and floating header.

FIG. 8 is a schematic for a dynamic header terrain following system combined with the illustrated resilient float system and floating header.

FIG. 9A shows a side-view of the combine operating on level ground with the illustrated dynamic header terrain following system and floating header.

FIG. 9B shows the combine operating on inclining ground with the illustrated dynamic header terrain following system at a first instance.

FIG. 9C shows the combine operating on inclining ground with the illustrated dynamic header terrain following system at a second instance.

FIG. 9D shows the combine operating on declining ground with the illustrated dynamic header terrain following system at a first instance.

FIG. 9E shows the combine operating on declining ground with the illustrated dynamic header terrain following system at a second instance.

DETAILED DESCRIPTION

Figure 1:
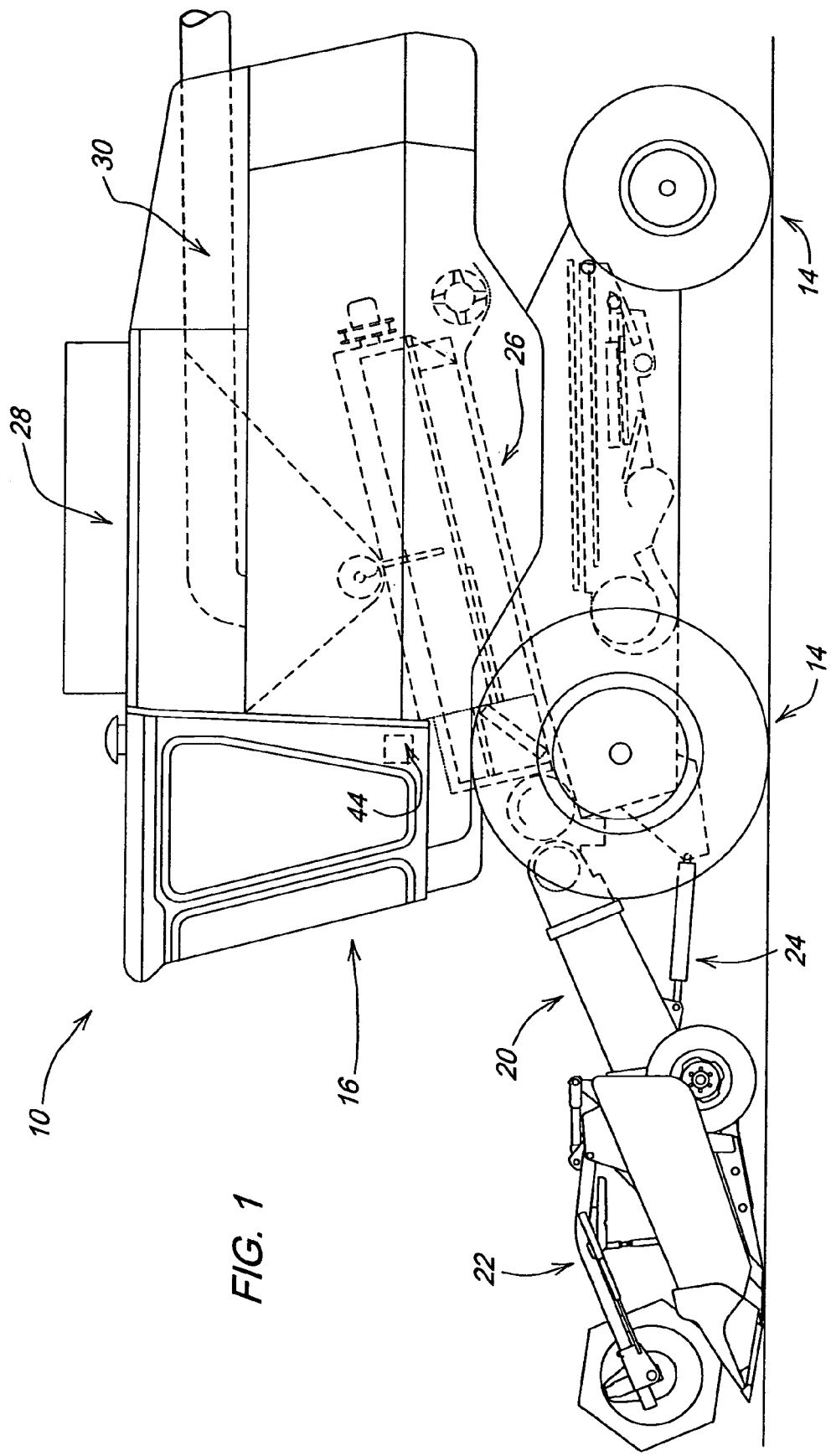
FIG. 1 is a side-view of a combine, showing a floating header having an integrated hydraulic float suspension.

FIG. 1 illustrates a self-propelled combine 10 commonly used in a grain farming to harvest a variety of crops from a field. An onboard engine powers the combine 10, while ground engaging wheels 14 support and propel the machine. An operator controls the combine 10 from an operator's station located in a cab 16 at the front of the machine. An electronic controller 44, which receives commands from operator input devices and sensors, commands various function of the combine 10.

A feederhouse 20 pivotally attaches at the front of the combine 10, supporting a header 22 removably attached to the front of the feeder house 20. A pair of lift cylinders 24 support and articulate the feederhouse 20 from the combine 10, enabling the raising and lowering of the header 22 relative to the ground. The lift cylinders 24 are single or double acting hydraulic cylinders connected to a main hydraulic circuit 40 by a lift valve 42. The lift valve 42 is an electronically controlled hydraulic valve commanded by the controller 44.

During a harvesting operation, the combine 10 moves forward through the field with the header 22 lowered to a working height. The header 22 cuts and transfers crop material to the feederhouse 20, which in turn transfers the crop material into the combine 10. Once inside the combine, threshing and separating assemblies 26 remove grain from the crop material and transfer it to a grain tank 28 for temporary holding. Crop material other than grain exits from the rear of the combine 10. An unloading auger 30 transfers the grain from the grain tank 28 to a truck or grain cart for transport, or to another receiving bin for holding.

Figure 2:
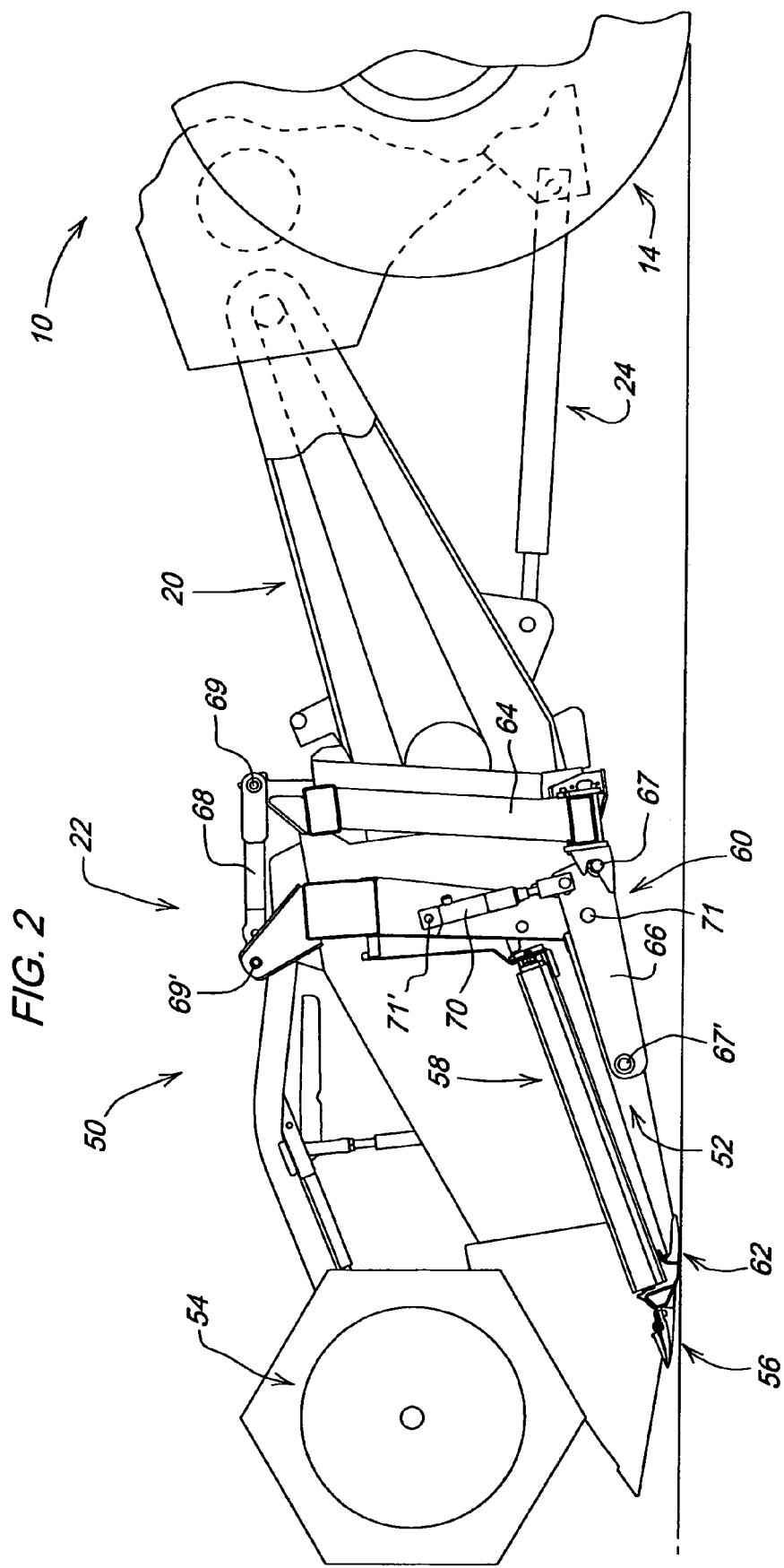
FIG. 2 is a partial side-view of the combine, showing the floating header attached at the front of a feederhouse.

FIG. 2 shows a side-view of a combine 10, illustrating an embodiment for a floating header configuration 50 for a draper-type header. The header 50 includes a frame 52 having a conventional configuration, the frame 52 supporting a reel assembly 54, a cutter-bar assembly 56, and a draper assembly 58. A floating suspension system 60 extending from the rear of the frame 52 primarily supports the header 50 from the feederhouse 20, while downward extending support member 62 serves to secondarily support the header 50 from the ground. In the illustrated embodiment, this support member is a skid plate 62 located near the front of the frame 52, however the portion could also be a gage-wheel (not shown).

The suspension system 60 includes a sub-frame 64 removably attaching to the feederhouse 20, one or more lower links 66, one or more upper links 68, one or more float cylinders 70, a float circuit 72, and a float valve 74. The illustrated embodiment employs two parallel lower links 66, each having a first end 67 pivotally attaching near the bottom of the sub-frame 64. Each lower link 66 extends forward and has a second end 67' pivotally attaching beneath the header frame 52. The illustrated embodiment uses one upper link 68, having a first end 69 pivotally attaching near the top of the sub-frame 64. The upper link 68 extends forward and has a second end 69' pivotally attaching high on the header frame 52.

In the illustrated embodiment, two float cylinders 70, one corresponding to each lower link 66, support the frame 52 from the sub-frame 64. Each float cylinder 70 has a first end 71 attaching to its corresponding lower link 66 near the lower link first end 67. Each float cylinder 70 extends upward and has a second end 71' attaching to the header frame 52. Each float cylinder 70 is a single acting hydraulic cylinder adapted to independently reciprocate over a limit range. Each float cylinder 70 connects to the float circuit 72, which in turn connects to the main hydraulic circuit 40 via the float valve 74. The float valve 74 is adapted to selectively add and subtract hydraulic fluid from the float circuit 72. The illustrated float valve 74 is an electronically controlled hydraulic valve commanded by the controller 44. The float valve 74 is optionally located either on the floating header 22 or on the combine 10.

Figure 5A:
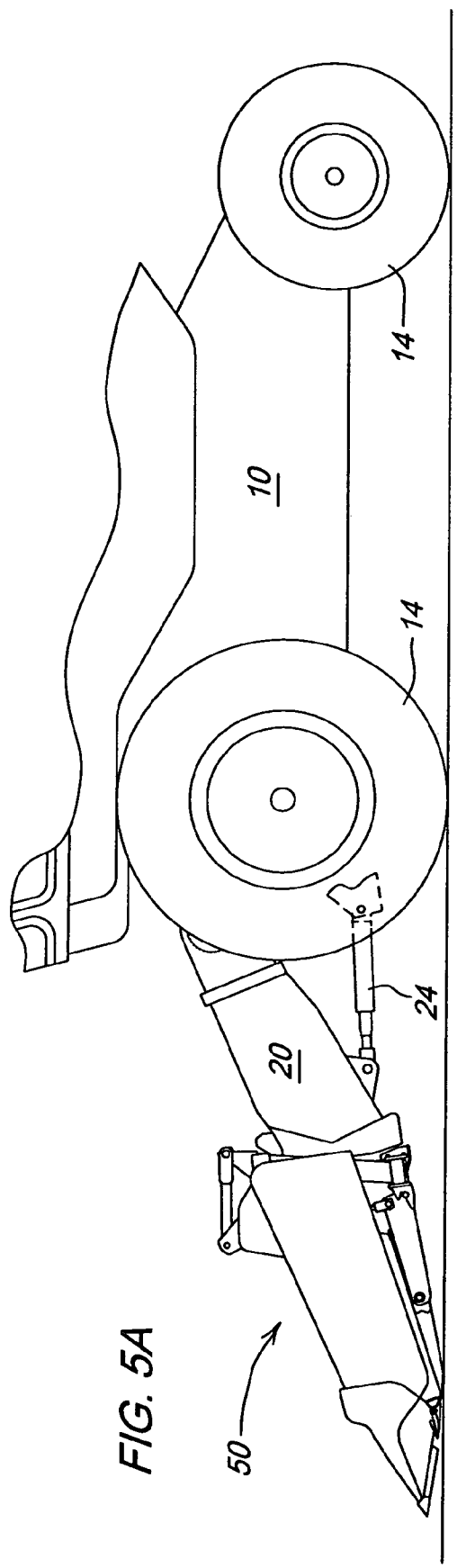
FIG. 5A shows a side-view of the combine operating on level ground with an illustrated float system and the floating header.

FIGS. 3 and 4 show schematics illustrating first and second embodiments, 80, 82 respectively, for header float systems used with the floating header 50. The first embodiment 80 is a dynamic float system, while the second embodiment 82 is a resilient float system. Both header float systems serve to reduce the apparent weight of the header 50 when the working height is such that the header 50 remains in contact with the ground, illustrated in FIG. 5A.

Figure 5B:
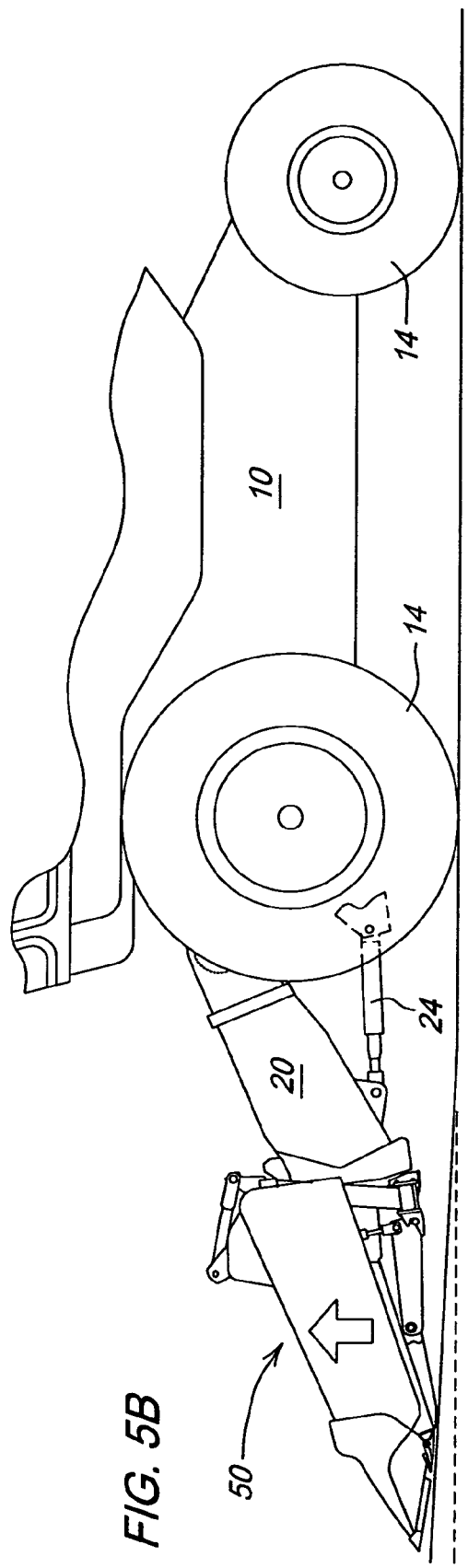
FIG. 5B shows a side-view of the combine operating on inclining ground with an illustrated float system and the floating header.
Figure 5C:
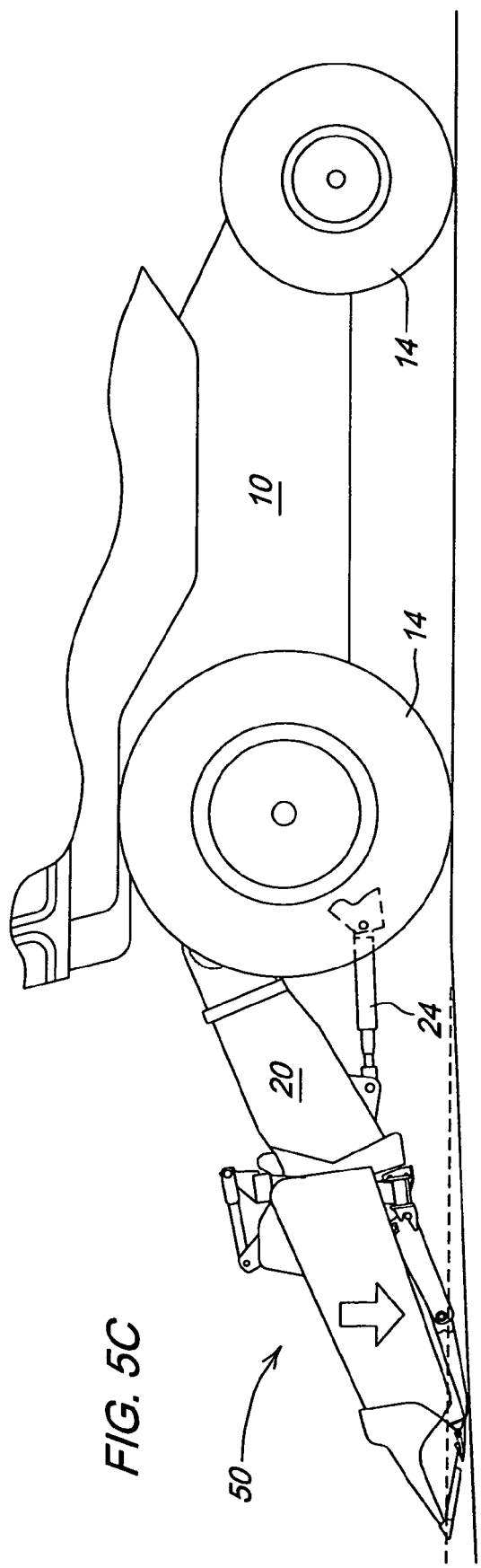
FIG. 5C shows a side-view of the combine operating on declining ground with an illustrated float system and the floating header.

With the apparent weight reduced, the header 50 lightly skids across the ground as the combine 10 moves forward during a harvesting operation, enabling the header 50 to follow changing terrain automatically within the limits of the suspension system 60. As the header 50 skids forward, the ground urges the header 50 up as slope inclines, illustrated in FIG. 5B, and gravity urges the header 50 down as slope declines, illustrated in FIG. 5C. Additionally, the header 50 provides some role angle floatation relative to the combine 10 due to independent reciprocation of each float cylinder 70, illustrated in FIGS. 6A and 6B.

In the first embodiment 80, a pressure sensor 84 in communication with the controller 44 connects to the float circuit 72 between the float cylinders 70 and the float valve 74. Within the cab 16, operator input devices in communication with the controller 44 allow the operator to control the function of the float system in both embodiments. Operator input devices include, but are not limited to, a float activation device 86 and a float setting device 88. Examples of float activation devices 86 include toggle switches or push buttons. Examples of float setting devices 88 include analog dial input devices or digital input devices. Not shown, an optional shut-off valve isolates the float cylinders 70 from the hydraulic circuit 40, allowing for service of the header 50. Having all of the elements of the first embodiment 80, the second embodiment 82 further includes an accumulator 90 connecting to the float circuit 72 between the float cylinders 70 and float valve 74.

During a harvesting operation with either embodiment 80, 82, the operator engages the float activation device 86 to operate the header 50 in a float mode, and may also manipulate the float setting device 88 for desired header float response. Once engaged in the header float mode, the controller 44 reads the float setting device 88, indicating a level of suspension support required of the float system 80, 82 by the operator, for example, as percent of header weight or desired pressure in the float circuit. The controller 44 then determines a target pressure in the float circuit adequate to provide the suspension support commanded.

To determine the target pressure for the float circuit 72, the controller 44 may reference data correlating pressure values in the float circuit 72 with suspension support values. This correlated pressure data will vary from header to header as a function of header weight and suspension configuration, and may generate from tables, formulas, or sensor readings. The controller 44 might read the correlated data from a storage device on the header 50. Data might also be stored in memory internal to the combine, with the controller 44 selecting the appropriate data after sensing the header type attached to the combine 10.

Alternatively, the controller 44 may determine the target pressure for the float circuit 72 by reading the pressure sensor 84 in the float circuit 72 when the header 50 at a height where the skid plates are not in contact with the ground. At such a height, the suspension supports the entire weight of the header, and the pressure in the float circuit indicates a baseline pressure whereby the float cylinders 70 entirely support the header 50. The controller 44 then determines the target pressure by multiplying the baseline pressure by a factor corresponding to the suspension support indicated from the float setting device 88.

In the first embodiment 80, the controller 44 continuously compares the target pressure with pressure sensor 84 readings indicating pressure in the float circuit 72, commanding the float valve 74 to add or subtract hydraulic fluid from the float circuit 72 to maintain pressure sensor 84 readings equal to the target pressure. In this manner, the controller 44 continuously maintains target pressure in the float circuit 72 as the float cylinders 70 reciprocate over changing terrain, providing constant support of the header 50 by the float suspension 60 as the combine 10 travels through the field. To change header float response while operating in header float mode, the operator may further manipulate the float setting device 88 without disengaging the float system. The controller 44 continuously monitors the float setting device 88 for changes, determining and applying new target pressures accordingly. The header float system continues to function until the operator disengages the float activation device 86.

In the second embodiment 82, the controller 44 only initially compares the target pressure with the pressure sensor 84 readings indicating float circuit 72 pressure, commanding the float valve 74 to add or subtract hydraulic fluid from the float circuit 72 until the reading from the pressure sensor 84 matches the target pressure. Once charged to the target pressure, the float circuit 72 is sealed and the accumulator 90 acts to maintain target pressure in the float circuit 72 as the float cylinders 70 reciprocate over changing terrain. To change header float response while operating in header float mode, the operator may further manipulate the float setting device 88 without disengaging the float system. The controller 44 continuously monitors the float setting device 88 for changes, determining and applying new target pressures accordingly. The header float system continues to function until the operator disengages the float activation device 86.

FIGS. 7 and 8 show schematics illustrating first and second embodiments, 92, 94 respectively, for a terrain following system used with the floating header 50. Both systems serve to extend the terrain following capability of the floating header system 80, 82 by dynamically actuating the lift cylinders 24 in response to reciprocation of the float cylinders 70. As the ground urges the header 50 up on inclines, shown in FIG. 9B, the terrain following system 92, 94 causes the lift cylinders 24 to raise the header 50 upward such that the float cylinders 70 return to a nominal position, shown in FIG. 9C. As gravity urges the header 50 down on declines, shown in FIG. 9D, the terrain following system 92, 94 causes the lift cylinders 24 to lower the header 50 downward such that the float cylinders 70 again return to their nominal position, shown in FIG. 9E.

The first embodiment 92 is a terrain following system used with the dynamic header float system 80, while the second embodiment 94 is a terrain following system used with the resilient header float system 82. In both embodiments, a position sensor 96 in communication with the controller 44, in the form of a potentiometer, indicates relative reciprocation of each cylinder. In the illustrated embodiments, each position sensor 96 attaches to a corresponding lower link 66 and to the frame 52. Within the cab 16, operator input devices in communication with the controller 44 allow the operator to control the function of the terrain following system 92, 94. Operator input devices include, but are not limited to, a lift command device 98 and a system activation device 100. Examples of system activation devices 100 include toggle switches or push buttons. Examples of lift command devices 98 include levers or joystick controls.

During a harvesting operation with either embodiment 92, 94, the operator manipulates the lift command device 98, causing the controller 44 to command the lift cylinders 24 to lower the header 50 until the header 50 contacts the ground. The operator then engages the system activation device 100 to operate in a terrain following mode. Once engaged, the controller 44 continuously reads both position sensors 96, calculates the average of the position sensor 96 readings, and then commands the lift valve 42 to add or subtract hydraulic fluid from the lift cylinders 24 until the average of the position sensor 96 readings indicate that the float cylinders 72 are at their nominal position. In this manner, the controller 44 continuously adjusts header 50 height over changing terrain, positioning the float header 50 for optimal function of the header float system 80, 82 as the combine 10 travels through the field. The terrain following system 92, 94 continues to function until the operator disengages the system activation device 100, or until the operator manipulates the lift command device 98 to raise or lower the header 50.

Having described the preferred embodiment, it will become apparent that various modifications can be made without departing from the scope of the invention as defined in the accompanying claims.

The invention claimed is:

1. In an agricultural combine having a main hydraulic circuit, a dynamic header float system comprising:
   a floating header having a frame, a support member supporting the frame from the ground, and a suspension variably supporting the frame from the combine, the suspension having a sub-frame removably attaching to a feederhouse at the front of the combine, a plurality of links movably attaching the frame and the sub-frame, and one or more float cylinders moveably supporting the frame from the sub-frame, the floating header further having a float circuit connecting to each float cylinder, and a float valve connecting the float circuit to the main hydraulic circuit, the float valve adapted to controllably add and subtract hydraulic fluid in the float circuit;
   a pressure sensor connecting to the float circuit, the pressure sensor adapted to sense hydraulic pressure in the float circuit; and
   a controller, that when engaged in a header float mode, maintains pressure in the float circuit at a target value by continuously reading pressure sensed by the pressure sensor and commanding the float valve to add and subtract hydraulic fluid in the float circuit in response.

2. The header float system described in claim 1 wherein the target value for float circuit pressure is sufficient to cause the float cylinders to provide a desired suspension support from the combine when the header is at a working height with the support member contacting the ground.

3. The header float system described in claim 1 further comprising a float setting device in communication with the controller, the float setting device adapted to receive operator commands defining the desired suspension support.

4. The header float system described in claim 1 or 3 further comprising a float activation device in communication with the controller, the float activation device adapted to receive operator commands for engagement and disengagement of the header float mode.

5. The header float system described in claim 2 or 3 wherein the controller determines the target value for float circuit pressure by comparing the desired suspension support with data correlating float circuit pressure values to suspension support values.

6. The header float system described in claim 2 or 3 wherein the controller determines the target value for float circuit pressure by reading pressure sensed by the pressure sensor when the header is at a height without the support member contacting the ground, and multiplying the reading by a factor corresponding to the desired suspension support.

7. In an agricultural combine having a main hydraulic circuit, a dynamic header float system comprising:
   a floating header having a frame, a support member supporting the frame from the ground, and a suspension variably supporting the frame from the combine, the suspension having a sub-frame removably attaching to a feederhouse at the front of the combine, a plurality of links movably attaching the frame and the sub-frame, and one or more float cylinders moveably supporting the frame from the sub-frame, the floating header further having a float circuit connecting to each float cylinder, and a float valve connecting the float circuit to the main hydraulic circuit, the float valve adapted to controllably add and subtract hydraulic fluid in the float circuit;
   a pressure sensor connecting to the float circuit, the pressure sensor adapted to sense hydraulic pressure in the float circuit;
   a float setting device adapted to receive operator commands defining a desired suspension support;
   a float activation device adapted to receive operator commands for engagement and disengagement of the header float mode; and
   a controller, that when engaged in a header float mode, establishes a target value for float circuit pressure corresponding to the desired suspension support, and maintains pressure in the float circuit at the target value by continuously reading pressure sensed by the pressure sensor, and commanding the float valve to add and subtract hydraulic fluid in the float circuit in response.

8. The header float system described in claim 7 wherein the controller determines the target value for float circuit pressure by comparing the desired suspension support with data correlating float circuit pressure values to suspension support values.

9. The header float system described in claim 7 wherein the controller determines the target value for float circuit pressure by reading pressure sensed by the pressure sensor when the header is at a height without the support member contacting the ground, and multiplying the reading by a factor corresponding to the desired suspension support.

10. In an agricultural combine having a main hydraulic circuit, a resilient header float system comprising:
    a floating header having a frame, a support member supporting the frame from the ground, and a suspension variably supporting the frame from the combine, the suspension having a sub-frame removably attaching to a feederhouse at the front of the combine, a plurality of links movably attaching the frame and the sub-frame, and one or more float cylinders moveably supporting the frame from the sub-frame, the floating header further having a float circuit connecting to each float cylinder, and a float valve connecting the float circuit to the main hydraulic circuit, the float valve adapted to controllably add and subtract hydraulic fluid in the float circuit;
    a pressure sensor connecting to the float circuit, the pressure sensor adapted to sense hydraulic pressure in the float circuit;
    an accumulator connecting to the float circuit, the accumulator adapted to maintain constant hydraulic pressure in the float circuit; and
    a controller, that engaged in a header float mode, initially charges pressure in the float circuit at a target value by reading pressure sensed by the pressure sensor, commanding the float valve to add and subtract hydraulic fluid in the float circuit in response, and then commanding the float valve to seal the float circuit once pressure in the float circuit equals target pressure.

11. The header float system described in claim 10 wherein the target value for float circuit pressure is sufficient to cause the float cylinders to provide a desired suspension support from the combine when the header is at a working height with the support member contacting the ground.

12. The header float system described in claim 10 further comprising a float setting device in communication with the controller, the float setting device adapted to receive operator commands defining the desired suspension support.

13. The header float system described in claim 10 or 12 further comprising a float activation device in communication with the controller, the float activation device adapted to receive operator commands for engagement and disengagement of the header float mode.

14. The header float system described in claim 11 or 12 wherein the controller determines the target value for float circuit pressure by comparing the desired suspension support with data correlating float circuit pressure values to suspension support values.

15. The header float system described in claim 11 or 12 wherein the controller determines the target value for float circuit pressure by reading pressure sensed by the pressure sensor when the header is at a height without the support member contacting the ground, and multiplying the reading by a factor corresponding to the desired suspension support.

* * * * *